United States Patent
Wang

(10) Patent No.: US 6,731,409 B2
(45) Date of Patent: May 4, 2004

(54) SYSTEM AND METHOD FOR GENERATING COLOR DIGITAL WATERMARKS USING CONJUGATE HALFTONE SCREENS

(75) Inventor: Shen-ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 496 days.

(21) Appl. No.: 09/773,004

(22) Filed: Jan. 31, 2001

(65) Prior Publication Data

US 2002/0102007 A1 Aug. 1, 2002

(51) Int. Cl.⁷ .............................................. H04N 1/419
(52) U.S. Cl. ........................ 358/3.28; 382/100; 235/496
(58) Field of Search ................................. 382/100, 232, 382/233, 234, 235, 236, 237, 238, 239, 242, 244, 248, 251; 358/3.08, 3.07, 3.01, 1.8, 3.06, 3.28, 3.11; 380/51; 235/494, 469

(56) References Cited

U.S. PATENT DOCUMENTS

| | | | | |
|---|---|---|---|---|
| 5,315,098 A | * | 5/1994 | Tow | 235/494 |
| 5,337,361 A | * | 8/1994 | Wang et al. | 380/51 |
| 5,673,121 A | * | 9/1997 | Wang | 358/3.23 |
| 5,706,099 A | * | 1/1998 | Curry | 358/3.28 |
| 5,734,752 A | * | 3/1998 | Knox | 358/3.28 |
| 5,790,703 A | * | 8/1998 | Wang | 358/3.28 |
| 6,252,675 B1 | * | 6/2001 | Jacobs | 358/1.9 |

OTHER PUBLICATIONS

"Cloaking Device for Top–Secret Faxes", Electronic Imaging Review, Center for Electronic Imaging Systems, University of Rochester, N.Y., Fall, 1995, vol. 2, No. 3, p. 4.

U.S. patent application Ser. No. 09/060,469, Wang, filed Apr. 1998.

Tohru, "Counterfeit Detection Method", Xerox Disclosure Journal, vol. 20, No. 6, Nov./Dec. 1995.

"Digimarc Corp. Announces New Copyright Protection Technology; Irremovable Signatures Protect Creative Property in the Digital Age," Jun. 28, 1995.

"Dice and Digimarc File for Ptents for 'Scatte–Gun' Electronic Watermark Technology," Oct. 4, 1995, Computergram International.

"Holographic signatures for digital images; authentication, verification and protection for copyright holders" (Digimarc Corp's copyright protection technology), Aug. 14, 1995, Seybold Report on Desktop Publishing, v9, n. 12, p. 23(2).

* cited by examiner

Primary Examiner—Timothy M. Johnson
Assistant Examiner—Seyed Azarian
(74) Attorney, Agent, or Firm—Oliff & Berridge, PLC

(57) ABSTRACT

The present invention is directed to an improved method for producing color watermarks in digitally reproducible color documents. The color watermarks are generated by producing a halftone pattern, which appears as stochastically distributed dots, in at least one or more color separations of the color document. A second halftone pattern, which also appears as stochastically distributed dots and is spatially displaced from the first halftone pattern, is generated in at least one or more different color separations. Portions of the first and second halftone patterns are auto-correlated or conjugally correlated, therefore, when the two halftone patterns are laid over each other, watermark patterns of highly contrasting colors become markedly visible.

9 Claims, 10 Drawing Sheets

(2 of 10 Drawing Sheet(s) Filed in Color)

SYSTEM AND METHOD FOR GENERATING COLOR DIGITAL WATERMARKS USING CONJUGATE HALFTONE SCREENS

BACKGROUND OF THE INVENTION

1. Field of Invention

This invention is directed to a process for applying a color watermark to a digitally reproducible color image to enable the verification of the color image's authenticity.

2. Description of Related Art

Watermarks have long been used in the printing industry to identify the source or origin of a document. Generally, a watermark appears as a faint pattern in an image, which is visible only when the original document is viewed in a particular manner. Unless a copyist had access to the watermarked paper, it would be difficult for the copyist to reproduce the document without revealing the document's inauthenticity. That is, without the paper on which the original image was originally printed, the copy would be readily detectable. However, as people move away from the use of watermarked papers for cost and other practical reasons, it is still necessary to identify the source or origin of a document image.

The introduction of plain paper copies has resulted in a proliferation of paper copies of paper originals. A similar result is happening to electronic images, given the easy availability of digital scanners and the quick and widespread access to images throughout the Internet. It is now very difficult for the creator of an image to generate an electronic original that the creator can be assured will not be illegally copied and spread to third parties. A digital watermark aims to prevent that spread, by incorporating an identifying mark within the image that allows the source of the image in an electronic copy to be identified. It is important that the identifying mark not disturb or distract from the original content of the image, while at the same time allowing the source to be easily identified.

Watermark identification may be accomplished by embedding a watermark in a digital or printed page that will identify the owner of rights to the image. In the past, these images have been produced and delivered in hard copy. In the future, these images will be distributed mainly in digital form. Therefore, image identification will have to work for both hard copy and digital image forms.

Watermarking can take two basic forms: visible or perceptible, and invisible or imperceptible. Visible watermarks are marks, such as copyright symbols or logos, that are imprinted into the digital or printed image to be distributed. The presence of the watermark is made clearly visible in the image in a way that makes it difficult to remove the watermark without damaging the image. The presence of the visible watermark does not harm the usefulness of the image. However, visible watermarks may interfere with the image aesthetics. The visible watermark is also a potential target for fraud, in that it is possible for a fraudulent copier of the image to identify the location of the watermark and attempt to reproduce the image without the watermark.

Invisible watermarks are marks, such as copyright symbols, logos, serial numbers, etc., that are embedded into digital or printed images in a way which is not easily discernible to the unaided eye. At a later time, the information embedded in these watermarks can be derived from the images to aid identification of the source of the image, including the owner and the individual to whom the image is sold. Such watermarks are useful for establishing ownership when ownership of an image is in dispute. Such watermarks are less likely to be useful as a deterrent to the theft of the image.

While either or both visible or invisible watermarks are desirable in an image, they represent different techniques for either preventing copying or detecting copying. It is anticipated that document producers may wish to use both kinds of protection.

Previously, a number of patents and publications have disclosed watermarking or other digital information encoding techniques for use with documents. The patents and publications summarized below are all incorporated herein by reference in their entireties.

A method of embedding information into halftones was suggested by Tuhro, "Counterfeit Detection Method", Xerox Disclosure Journal, Vol. 20, No. 6, November/December 1995. This method makes slight deviations in the position of the halftone dots from cell to cell. Alternatively, the position of a line screen could be varied by small amounts to encode information. The decoding would be accomplished by laying a halftone screen that has no such deviations on top of the encoded image. The locations of the halftone cell deviations show up as a beat pattern. The difficulty of this method is that the information could easily be lost within the printer distortions. The goal would be to make the deviations as small as possible to avoid their being seen. This results in the deviations being hard to detect as well.

A second method is described in U.S. Pat. No. 5,706,099 to Curry. This method processes halftone dots, called serpentine dots, that are symmetric in shape. These dots are designed to fit well together when rotated and placed side by side. This enables different rotations of the dots to be placed across the page, encoding arbitrary information into the halftone pattern. From a visual inspection, the changing shapes of the symmetric patterns are not displeasing to the eye. This method suffers from the same problems as the method by Tuhro. In order to make sure that the information cannot be seen by the eye, the halftone cells need to be made as small as possible. As cell size is reduced, it becomes harder to detect cell orientation.

Yet another process for embedding information into an image is through the use of glyphs. As disclosed in U.S. Pat. No. 5,315,098 to Tow, glyphs are small, three to five pixel length lines in which the orientation of the line represents one of a small number of values. Thus, a stream of data can be represented by glyphs, where each line varying in orientation in order to provide an encoded view of the information. Glyphs differ from watermarks in that the glyphs encode information via some numerical method, while watermarks represent the actual image. The glyphs may be machine readable by means of human invisible characteristics of the print materials, such as their infrared reflectivity, their high-resolution spectral detail, their metameric spectral characteristics, their magnetization, or the like. These machine detectable materials may be incorporated into the same printing process that is employed for printing the human-readable rendering, such as by utilizing xerographic toners which have machine-recognizable, human-invisible characteristics, together with their usual visible characteristics of color, whiteness, blackness, transparency and opacity.

U.S. Pat. No. 5,337,361 to Wang et al. describes an information area that can overlay a graphic image and include information encoded in an error correctable, machine-readable format. This method allows recovery of the information despite distortions due to the underlying graphic image. The record may also represent the image by words similar in form to words in the image area. Both the image information and the graphic words can then be altered when an action regarding the record takes place. Wang et al. differs from the present invention in that it essentially provides a bar code encoding information other than the image that is desired to be seen.

"Cloaking Device for Top-Secret Faxes", Electronic Imaging Review, Center for Electronic Imaging Systems, University of Rochester, N.Y., Fall, 1995, Vol. 2, No. 3, Page 4, details software which supports an encryption method so that all the pages look the same: a random pattern of black and white dots filled with tiny black worms. The page is decrypted by placing a decryption key over the page. Text appears as either white lettering against a black background or dark lettering against a white background. Notably, in the images shown, the region where the image is located is discernible via changes in the random pattern of black and white dots.

Several articles referencing a method of adding a digital watermark are noted with respect to Digimarc Corp. "Digimarc Corp. Announces New Copyright Protection Technology; Irremovable Signatures Protect Creative Property in the Digital Age," Jun. 28, 1995, Business Wire, describes a copyright protection system in which hidden information is available with an image. See also, "Dice and Digimarc File for Patents for 'Scatter-Gun' Electronic Watermark Technology," Oct. 4, 1995, Computergram International; "Holographic signatures for digital images; authentication, verification and protection for copyright holders" (Digimarc Corp's copyright protection technology), Aug. 14, 1995, Seybold Report on Desktop Publishing, v9, n. 12, p. 23(2).

"NEC develops digital watermarking technique protecting copyrights of images and music on Internet," Feb. 12, 1996, —Business Wire, describes watermark information hidden in an image, using the spectral components of the data in a manner analogous to spread spectrum communications.

SUMMARY OF THE INVENTION

Accordingly, the inventor has identified a need in the hafltoning community for systems and methods for providing substantially invisible color watermarks in digitally reproduced color documents.

Various exemplary embodiments of the systems and methods according to this invention deal with a basic problem in providing substantially invisible watermarks in a digitally reproducible color document. In particular, in various exemplary embodiments of the systems and methods according to this invention the contrast of the colors of the watermark is enhanced to improve the watermark's detectability while reducing the detectability of the watermark in the base image.

A stochastic screen can be used to produce an invisible watermark. A stochastic halftone screen is a large threshold array that produces a halftone image having an appearance with randomly distributed dots. To produce an invisible watermark for a stochastic screen, at least one additional stochastic halftone screen is produced and used to incorporate watermark information into the document. In the various exemplary embodiments described below, the number of stochastic halftone screens corresponds to the number of color separations forming the color document. However, the number of stochastic halftone screens that can be used is not limited to the number of color separations, since the extension to more, or even less, stochastic halftone screens than the number of color separations is straightforward for those skilled in the art.

This invention is directed to systems and methods that produce color watermarks in digitally reproducible color documents. In various exemplary embodiments of the systems and methods according to this invention, the color watermarks are generated by producing a halftone pattern, which appears as stochastically distributed dots, in at least one or more color separations of the color document. A second halftone pattern, which appears also as stochastically distributed dots, is generated in at least one or more color separations of the color document. Portions of the first and second halftone patterns are either auto-correlated or conjugately correlated. As a result, when the two halftone patterns are laid over each to become properly aligned, or otherwise appropriately aligned, the watermark patterns of highly contrasting colors become markedly visible.

These and other features and advantages of this invention are described in, or are apparent from, the following detailed description of various exemplary embodiments of the systems and methods according to this invention.

BRIEF DESCRIPTION OF THE DRAWINGS

The patent application contains at least one photograph executed in color. Copies of this patent or patent application publication with color photographs will be provided by the office upon request and payment of the necessary fee.

Various exemplary embodiments of this invention will be described in detail, with reference to the following figures, wherein.

DETAILED DESCRIPTION OF EXEMPLARY EMBODIMENTS

Figure 1:
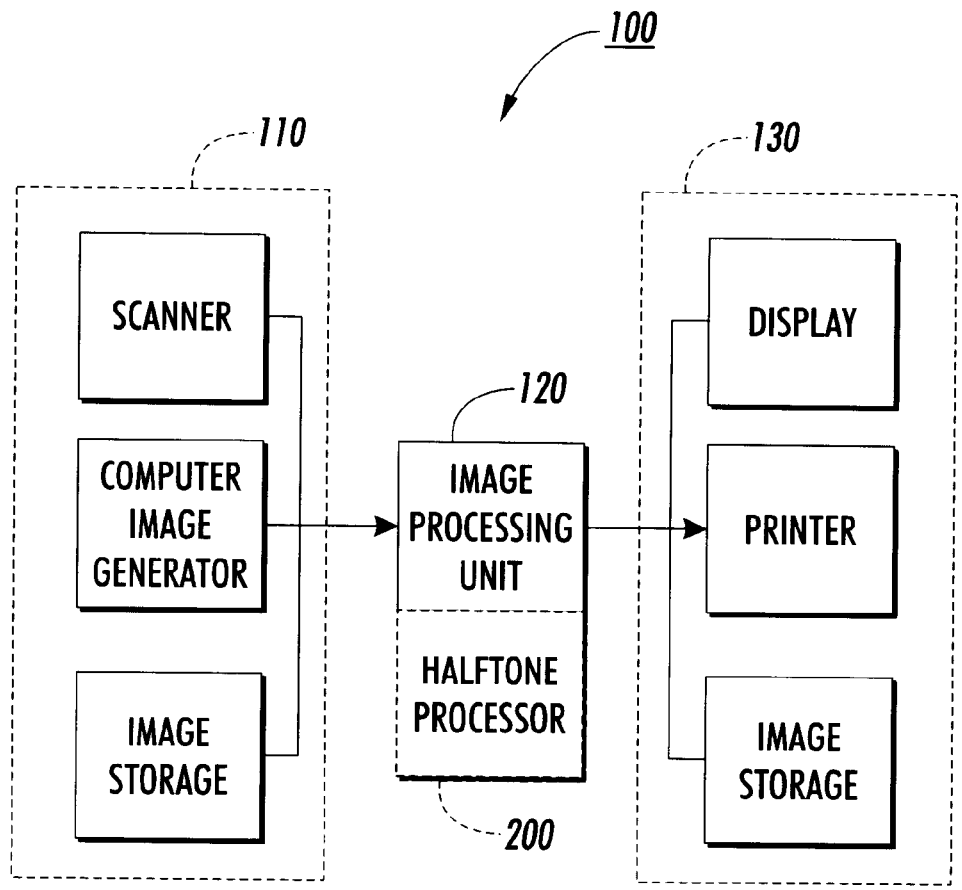
FIG. 1 is a block diagram of one exemplary embodiment of a color imaging system according to this invention.

This invention allows for a color pattern to be used on a color document, where the color pattern can be generated using a stochastic halftoning process to produce a desirable image. Using such techniques, the random nature of the stochastic screen affords the opportunity to include a unique authentication procedure in conjunction with correlations between different stochastic screens.

As a primer to the principles of color stochastic halftone screening, monochrome stochastic halftone screening is discussed below. In various exemplary embodiments, this invention uses the stochastic screening method described in U.S. Pat. No. 5,673,121 to Wang, incorporated herein by reference in its entirety.

Regarding monochrome stochastic halftone screening of monochromatic documents, halftone images are generated from constant gray-scale inputs by a screen matrix with N elements. If the overlap between adjacent pixels is ignored, the screen cell with n black pixels and N−n white pixels simulates the input with a gray scale (g) equal to $$g=(N-n)/N,$$

where $0 \leq n \leq N$ or $0 \leq g \leq 1$. The visual appearance of this pattern depends on whether the black pixels or the white pixels are minorities. If the black pixels are, for example, $0.5 \leq g \leq 1.0$, the best visual appearance of the halftone pattern occurs when all black pixels are "evenly" distributed, in other words, each black pixel should "occupy" $1/n$, or $1/(1-g)N$, fraction of the total area of the screen. Therefore, the average distance of adjacent black pixels should be equal to $\alpha(1-g)^{-1/2}$, where $\alpha$ is independent of gray levels. On the other hand, if the white pixels are minorities, i.e., $0 \leq g \leq 0.5$, each white pixel should "occupy" $1/(N-n)$ or $1/gN$, fraction of the total area and the average distance of adjacent white pixels should be equal to $\alpha g^{-1/2}$. An idealized stochastic dithering screen is defined as a threshold mask generating halftone images which satisfy the above criterion for all gray levels.

In general, input gray-scale images are specified by integer numbers, $G(x, y)$, where $0 \leq G \leq M$. As a result, the dithering screen should have M different threshold values spanning from zero to M−1. Moreover, at each level, there should be (N/M) elements having the same threshold value T. The ultimate goal of designing a stochastic screen is to distribute the threshold values T so that the resulting halftone images are as close as possible to the ones generated by an idealized stochastic screen.

Choosing an arbitrary pair of pixels from the dithering screen, we assume that the threshold values for these two pixels should be $T_1=T(x_1, y_1)$ and $T_2=T(x_2, y_2)$, respectively, where $(x_1, y_1)$ and $(x_2, y_2)$, are the coordinates of these pixels. As the result of dithering a constant input G, the outputs $B_1=B(x_1, y_1)$ and $B_2=B(x_2, y_2)$ have the following possible combinations:

$B_1=1$ and $B_2=1$, if $G \geq T_1$ and $G \geq T_2$;

$B_1=0$ and $B_2=0$, if $G<T_1$ and $G<T_2$;

$B_1 \neq B_2$, where B=1 represents a white spot and B=0 represents a black spot for printing. When one output pixel is black and another is white, the distance between these two pixels is irrelevant to the visual appearance for the reasons outlined above. When both pixels are white, the visual appearance under the following case must be considered:

If $M/2 \geq G$, $G \geq T_1$, and $G \geq T_2$.

In this case, both output pixels are white, and white spots are minorities. Therefore, the corresponding distance between $(x_1, y_1)$ and $(x_2, y_2)$ is relevant to the visual appearance of the halftone images. According to the analysis outlined above, this distance is greater or equal to $\alpha g^{-1/2}$, or $\alpha(G/M)^{-1/2}$, for outputs of an idealized stochastic screen. Among all G under this case, the critical case of G is the smallest one, or $G_c=\text{Max}(T_1, T_2)$, which requires the largest distance between the two pixels $(x_1, y_1)$ and $(x_2, y_2)$.

Similarly, when both dots appear as black dots, the visual appearance under the following case must be considered:

If $G \geq M/2$, $G<T_1$ and $G<T_2$.

Among all G under this case, the largest G is given by $G_c=\text{Min}(T_1,T_2)$, which requires the largest distance $\alpha(1-G_c/M)^{-1/2}$ between $(x_1, y_1)$ and $(x_2, y_2)$.

Mathematically, a merit function $q(T_2, T_2)$ can be used to evaluate the difference between the idealized stochastic screen and the chosen one. For example, the following choice is used for the experiment described later:

$$q(T_1, T_2)=\exp(-C \, d^2/d_c^2), \tag{1}$$

where $d^2=(x_1-x_2)^2+(y_1-y_2)^2$;

$d_c^2=M/[M-\text{Min}(T_1-T_2)]$, if $T_2>M/2$ and $T_1>M/2$, $d_c^2=M/\text{Max}(T_1, T_2)$, if $T_2 \leq M/2$ and $T_1 \leq M/2$, $d_c^2=0$, ie., $q=0$, elsewhere; and
C is a constant.

Since a dithering screen is used repeatedly for halftoning images larger than the screen, for any chosen pair of pixels from the dithering screen, the closest spatial distance in corresponding halftone images depends on the dithering method and should be used for the merit function. The overall merit function should include contributions of all possible combinations. In an experiment, the summation of $q(T_1, T_2)$ was for optimization, i.e.:

$$Q=\Sigma q(T_1, T_2), \tag{2}$$

where $\Sigma$ for all $(x_1, y_1) \neq (x_2, y_2)$.

The design of stochastic screens then becomes a typical optimization problem. When the threshold values of a chosen screen are rearranged, the merit function can be evaluated to determine the directions and steps. Many existing optimization techniques can be applied to this approach. The simplest method is to randomly choose a pair of pixels and swap threshold values to see if the overall merit function Q is reduced. Since only those Q values related to the swapped pair need to be recalculation, the evaluation of Q does not consume significant computation time. All initial threshold values were randomly chosen by a standard random number generator.

Alternatively, the threshold assignments from an existing screen may be used. Besides the Gaussian function described by Eq. (1) as the merit function, other functions were tested, such as the Butterworth function and its Fourier transform. Other optimization functions are possible. For each iteration, a pair of pixels was randomly chosen from the dithering screen, their threshold values swapped and the change of the merit function Q was calculated. If Q is not reduced, the threshold values are restored. Otherwise, the next iteration is performed. The optimization process continues until a satisfied distribution of threshold values is achieved.

The above issues discussed regarding monochrome stochastic screens can be developed to produce an invisible color watermark in a halftoned color document in accordance with various exemplary embodiments of the stochastic halftone screening methods according to this invention.

U.S. Pat. No. 5,790,703 to Wang, refers to digitally watermarking black and white documents using conjugate stochastic screens, and is incorporated herein by reference in its entirety.

Two screens, $T_1(x, y)$ and $T_2(x, y)$, having the same size and the same shape, are conjugate, if for all elements $(x, y)$ the corresponding pair of threshold values have the following relation:

$$T_1(x, y) + T_2(x, y) = M, \quad (3)$$

where M is the number of total possible levels. By the thresholding rule, which defines the binary status of the output $B(x, y)$ based on the relation between an input value $G(x, y)$ and the threshold value $T(x, y)$ provides:

$$B(x, y) = 1, \text{ if } G(x, y) \geq T(x, y);$$

$$B(x, y) = 0, \text{ if } G(x, y) < T(x, y).$$

It is interesting to notice that if the input image has a constant value, $G(x, y) = M/2$, the two binary outputs $B_1(x, y)$ and $B_2(x, y)$, generated by two conjugated screens $T_1(x, y)$ and $T_2(x, y)$ in Eq. 3, are exactly binary complement for all pixels. In other words, any black pixel of $B_1$ has a corresponding white pixel of $B_2$ at the same pixel location $(x, y)$, and vice versa. If the input level $G(x, y) < M/2$, the binary complement relation between $B_1$ and $B_2$ is still true for all white spots, as minorities in this case. If $G(x, y) > M/2$, the binary complement relation between $B_1$ and $B_2$ is true for all black spots, also as minorities in this case.

From the previous discussion on stochastic screens, it is not difficult to see that the conjugate screen $T_2(x, y)$, of a well-designed stochastic screen $T_1(x, y)$, is also a well-designed stochastic screen, because for every output level of $T_2$ there is a corresponding level of $T_1$, which is optimized during the screen design process. The principal difference is that if the level of $T_1$ is with black minorities, the corresponding level of $T_2$ is with white minorities, and similarly so for $T_1$ with white minorities. Consider the following two cases:

In a first example, two identical halftone images are generated using a stochastic screen $T_1(x, y)$ and printed on two transparencies, respectively. If the two transparencies are laid over each other and viewed in a show-through mode, the overall appearance depends on the relative position between the two halftone images. The maximal, or the brightest, show-through can be obtained only with a perfect pixel-to-pixel alignment of the two images without any lateral shift or rotation. It should be appreciated that this statement is an analogue of a two-dimensional auto-correlation of the halftone image. The maximal show-through corresponds to the peak value of the auto-correlation, or in other words, the positive peak of the correlation.

In another example, two halftone images are generated by two conjugated stochastic screens, $T_1(x, y)$ and $T_2(x, y)$ defined by Eq. 3, respectively. The cross-correlation between the two halftone images, generated by two conjugated screens, behaves opposite to the auto-correlation described above such that, after the two halftone images are laid over each other and perfectly aligned, the overall appearance reaches the minimal, or the darkest, show-through. Mathematically, this corresponds to a negative peak of the cross-correlation, or simply, the negative peak of the correlation.

These two examples can be relatively combined so that some portions of the second halftone image are generated by using the conjugate screen $T_2(x, y)$ while the remaining portion of the second image are generated by the same stochastic screen $T_1(x, y)$, as used to generate the first halftone image. Laying a transparency of the second image over the first one, a strong contrast occurs between the brightest and the darkest show-through, which sets the basis for the systems and methods for digital watermarking according to this invention.

Practically, combining the two portions of the second halftone image described above can be realized by designing a new stochastic screen $T_2(x, y)$, which has the same shape and size as the first stochastic screen $T_1(x, y)$. A portion of the new stochastic screen $T_2$ is made conjugate to the corresponding portion of the first stochastic screen $T_1$ while other portion of the new stochastic screen $T_2$ is made identical to a portion of the first stochastic screen $T_1$. By modifying the optimization condition for stochastic-screen design as described, for example, in the incorporated 121 patent, it is possible to make the boundary between the two portions of by the second screen visually seamless. Therefore, the halftone images generated by the new stochastic screen $T_2$ appear just as good as halftone images generated by the first stochastic screen $T_1$. Although the watermark, defined by the shape of the portion for the conjugate relation, is visually imperceptible, the information is hidden, or incorporated into the halftone images generated by the stochastic screen in a manner according to the degree of correlation.

The above procedure can be particularly applied to more than one color separation, such as, for example, cyan and magenta. By alternating the identical and conjugate relation for portions separating the watermark and the rest of the stochastic screen for multiple color separations or combinations of color separations, the watermark will be markedly visible as highly contrasting colors between the conjugately correlated and auto-correlated portions.

It will be further appreciated that the increased signal resulting from the difference between the conjugately correlated and auto-correlated regions may be detected with image processing techniques. In particular, it may be possible to scan and digitize a digital-watermarked color image and electronically superpose the conjugate color image over the digitized color image to detect the watermarked region on the digitized color image.

In an alternate method to generate an authenticable document, the information may also be incorporated by alternating between the two stochastic screens, $T_1(x, y)$ and $T_2(x, y)$ described above, while halftoning the original document. Therefore, the halftoned document is self-referencing and no special visualization "key" page is required to view the authentication image. Since portions generated by the two stochastic screens are side-by-side, self-referencing is immune from scaling and is robust to distortion introduced during printing and/or copying processes when the halftone document is generated or transferred. To achieve this alternate method, it is necessary to design the first and the second stochastic screens simultaneously. During the design process, in addition to the optimization requirement for general stochastic screens, as described in the incorporated 121 patent to the combined screen, constraints described by Eqs. (4) and (5) have to be satisfied.

The image processing systems and methods according to this invention may be readily implemented in software using object-oriented software development environments that provide portable source code that can be used on a variety of computer or workstation hardware platforms. Alternatively, the image processing systems and methods according to this invention may be implemented partially or fully in hardware using standard logic circuits or a VLSI design. Whether software or hardware is used to implement the system is dependent on the speed and efficiency requirements of the system, the particular function, and the particular software or hardware systems and microprocessor or microcomputer systems being utilized. The image processing system, however, can be readily developed by those skilled in the applicable arts without undue experimentation from the functional description provided herein together with a general knowledge of the computer arts.

FIG. 1 shows a block diagram of one exemplary general embodiment of a color imaging system according to this invention. As shown in FIG. 1, an electronic representation of an original document is obtained from an image input terminal 110 in a format related to the characteristics of the device and commonly with pixels defined at n bits per pixel. The electronic image signals will be directed through an image processing unit 120 to be processed so that an image suitable for reproduction on an image output terminal 130 is obtained. The image processing unit 120 commonly includes a halftone processor 200, which converts m-bit digital image data signals to n-bit image data signals suitable for driving a particular printer or other device, where m and n are integer values. Commonly, the images may be represented in a page description language format, describing the appearance of the page. In such a case, the image processing unit 120 may include a processing element for decomposing of the page, and color conversion elements for providing appropriate signals to drive a printer.

Figure 2:
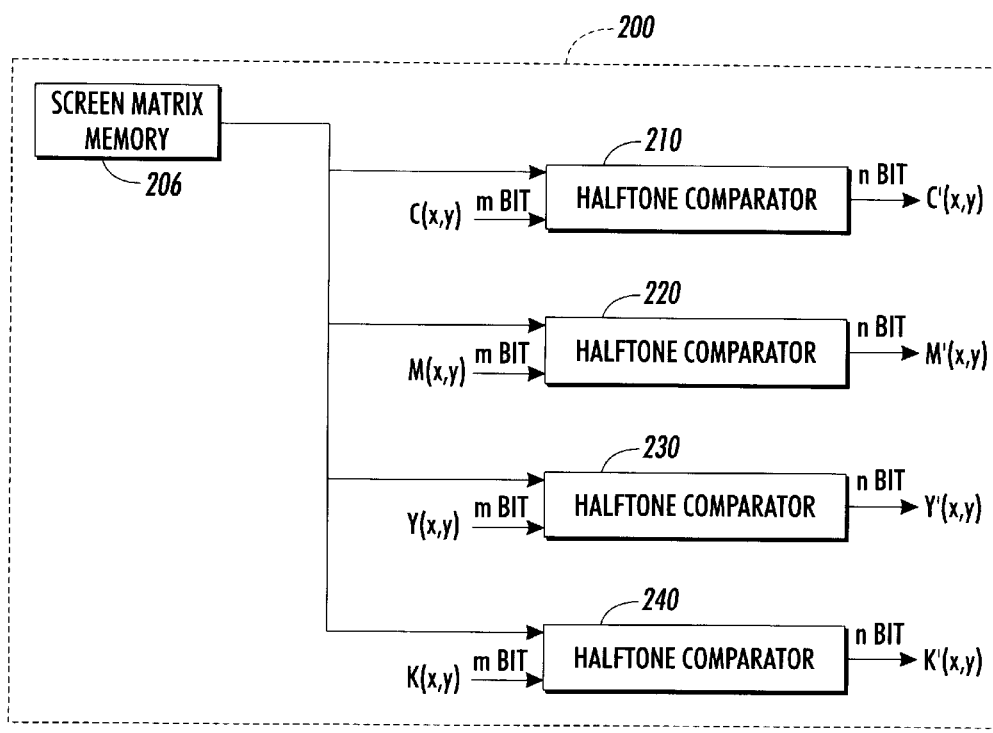
FIG. 2 is a block diagram of one exemplary embodiment of a halftone screening arrangement according to this invention.

FIG. 2 shows the operational characteristics of the halftone processor 200. In this example, a color processing system is illustrated using four color separations. The four color separations, C(x,y), M(x,y), Y(x,y), and K(x,y), are obtained in each process independently for halftoning purposes to reduce an m-bit input to an n-bit output. As depicted in FIG. 2, a source of screen matrix information, a screen matrix memory 206, provides an input to a number of comparators 210, 220, 230 and 240 for each color separation. The other input to the comparators 210, 220, 230 and 240 is the m-bit color separation image data. The output of each 210, 220, 230 and 240 is an n-bit output that can be directed to a printer or similar device to be rendered. This illustration is highly simplified in that distinct screen matrices may be supplied to each comparator 210, 220, 230 and 240.

Figure 3:
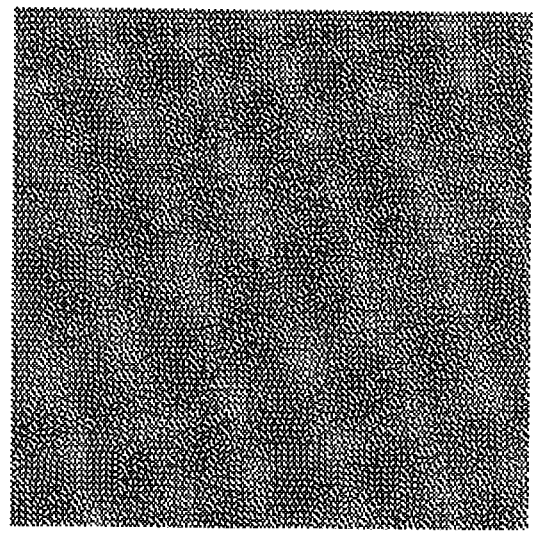
FIGS. 3 and 4 illustrate two halftone images generated by two conjugate stochastic halftone screens.
Figure 4:
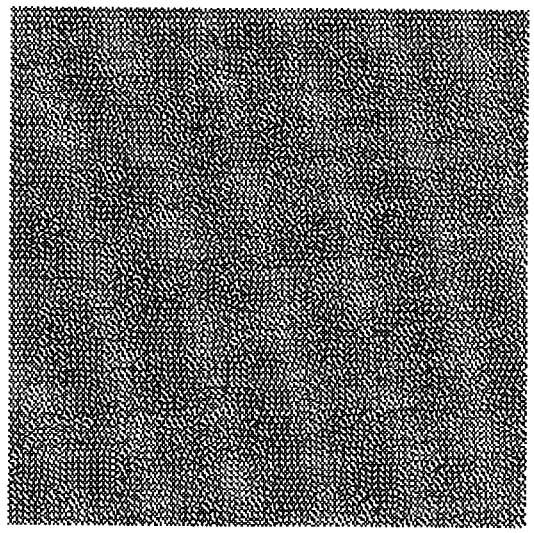

FIGS. 3 and 4 show two halftone patterns generated in a magenta color separation, for example, by first and second stochastic screens, respectively, produced by the stochastic screening process described below. These patterns represent a single color level. The screens are designed so that the patterns these screens generated are high frequency patterns that have very little power in low spatial frequencies. The design procedure takes into account wraparounds at the cell borders so that there are no edge effects when the patterns are replicated by subsequent halftone cells across the page, as it will be with the repeat of each cell.

A portion of the second stochastic screen shown in FIG. 4 is identical to the corresponding portion in the first screen shown in FIG. 3, while the other portion of the second screen is the conjugate of the corresponding portion of the first screen. If the threshold values of two screens are represented by $T_1(x, y)$ and $T_2(x, y)$, respectively, the identical relation and the conjugate relation between the two stochastic screens are described as:

$$T_2(x_1, y) = T_1(x, y), \text{ and} \quad (4)$$

$$T_2(x, y) = M - T_1(x, y), \quad (5)$$

where M is the number of total possible image value levels.

Without close examination, the second halftone pattern will look very much like the first pattern. When the pattern of FIG. 3 is placed on top of FIG. 4 with careful alignment, the encoded information will reveal itself on a macroscopic (e.g., halftone cell size) level. The information is encoded in the correlation relationship between the two patterns, macroscopically repeated and across broad areas, and not in the fine details or microscopic patterns.

Figure 5:
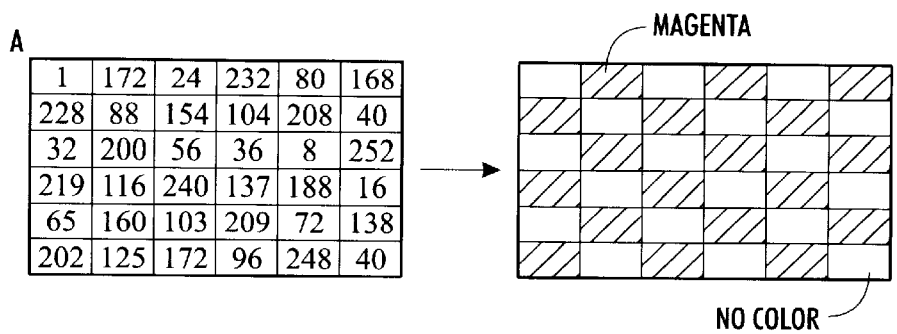
FIGS. 5 and 6 illustrate two halftone screens A and A', where the halftone screen A' is a conjugate screen of the halftone screen A.
Figure 6:
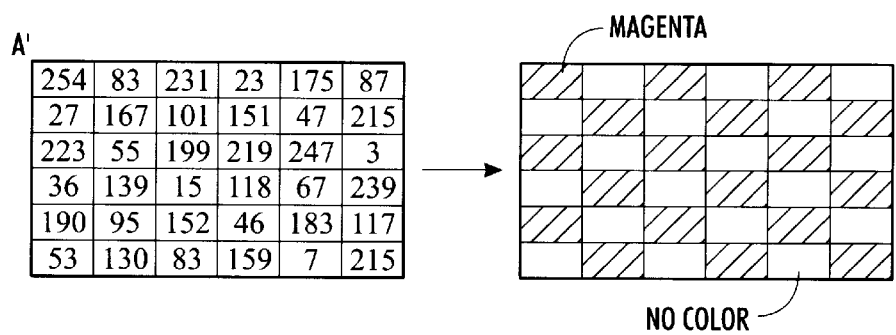

FIGS. 5 and 6 illustrate two halftone screens, A and A', on the left portion of the figures, and corresponding halftone output patterns, with a constant input level G=128, on the right portion of the figures. The halftone patterns are generated in a magenta color separation, for example, according to the stochastic method described above. The two halftone screens A and A' shown in FIGS. 5 and 6 are conjugates of one another, where each number represents a threshold value.

Figure 7:
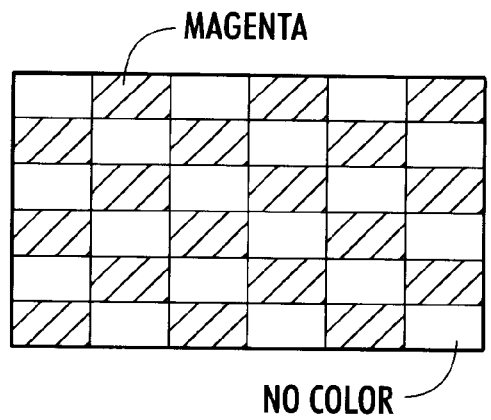
FIG. 7 illustrates the result obtained when the halftone output of FIG. 5 is laid directly over on top of itself.
Figure 8:
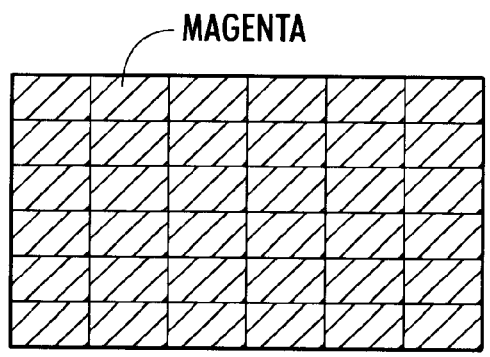
FIG. 8 illustrates the result obtained when the two output patterns by halftone screens of A and A', shown in FIGS. 5 and 6, are laid over each other.

FIG. 7 illustrates the resulting pattern formed if the halftone output of screen A, shown in the right portion of FIG. 5, is laid over itself. FIG. 8 illustrates the resulting pattern formed if the two halftone outputs of screen A and A' shown in the right portion of FIGS. 5 and 6, respectively, are laid over each other. The pattern shown in FIG. 7 is identical to the pattern of the right portion of FIG. 5, because the peak-value of an auto-correlation occurs with a zero-shift. However, the result of the conjugate correlation between the two binary patterns on the right portion of FIGS. 5 and 6 reveals a negative-peak correlation. The resulting pattern, similar to applying an "OR" operation to these two overlaid binary patterns, would be completely color saturated, as indicated by the image shown in FIG. 8. If a color input value G greater than 128 were applied to the two halftone screens A and A' in FIGS. 5 and 6, the result obtained by the superpositioning of the two halftone outputs would not be completely color saturated. Rather, the result would be the darkest among all possible combinations of the two halftone patterns both representing the color input value G. Obviously, it would be completely color saturated for a color input value of G less than 128.

Figure 9:
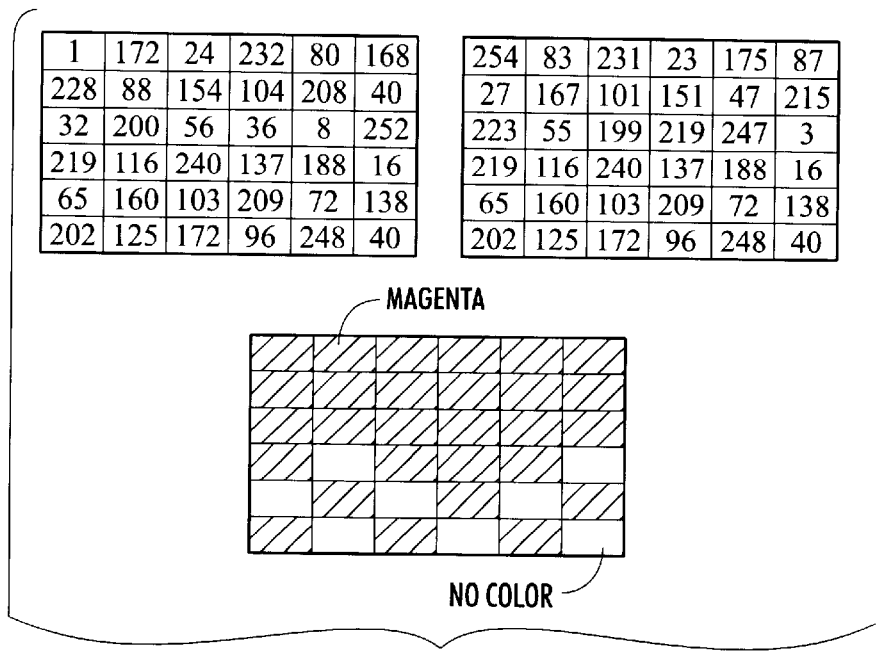
FIG. 9 illustrates two halftone screens, where the upper and lower portions of the two screens are conjugate and identical to each other, respectively.

FIG. 9 illustrates two halftone screens and the overlay of two halftone outputs by the two screens, respectively, for example, in a magenta color separation. The upper portion of the second halftone screen is a conjugate of the upper portion of the first halftone screen. In contrast, the lower portion of the second halftone screen is identical to the lower portion of the first halftone screen. The resulting conjugate and auto-correlation between the halftone outputs, shown on the right, becomes apparent. More importantly, because the upper portions contain conjugate elements and the lower portions contain identical elements, the visual contrast of the output is significantly altered relative to these areas. Specifically, the lower portions will be strongly positively correlated, while the upper portions will be strongly negatively correlated.

Figure 10:
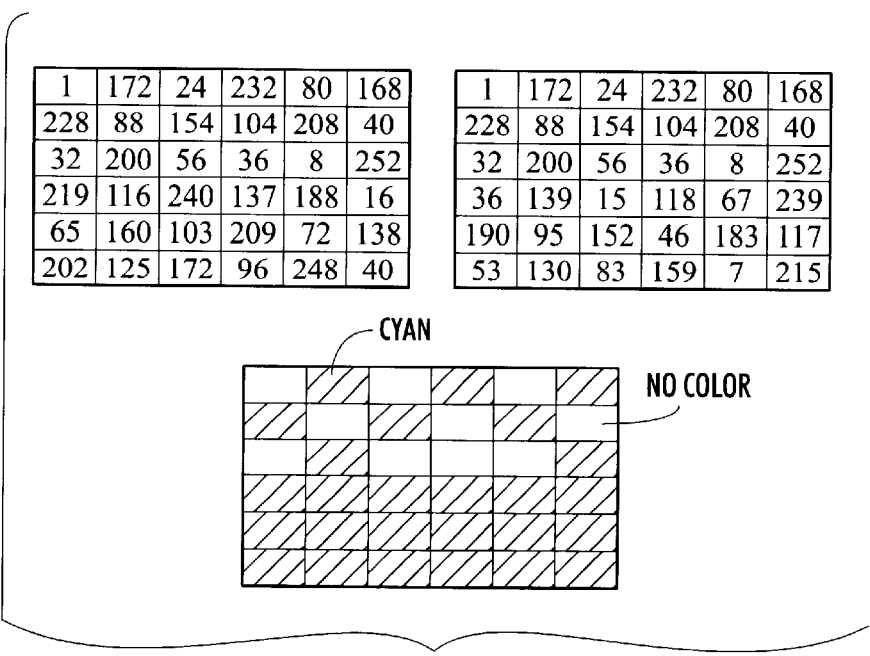
FIG. 10 illustrates two halftone screens, where the lower and upper portions of the two halftone screens are conjugate and identical to each other, respectively.

FIG. 10, similarly to FIG. 7, illustrates two halftone screens and the overlay of two halftone outputs by the two screens, respectively, for example, in a cyan color separation. The upper and lower portions of the overlay on the right side of FIG. 10 are reversed from the halftone pattern shown in FIG. 9. The lower portion of the second halftone screen is a conjugate of the lower portion of the first halftone screen. In contrast, the upper portion of the second halftone screen is identical to the upper portion of the first halftone screen.

Figure 11:
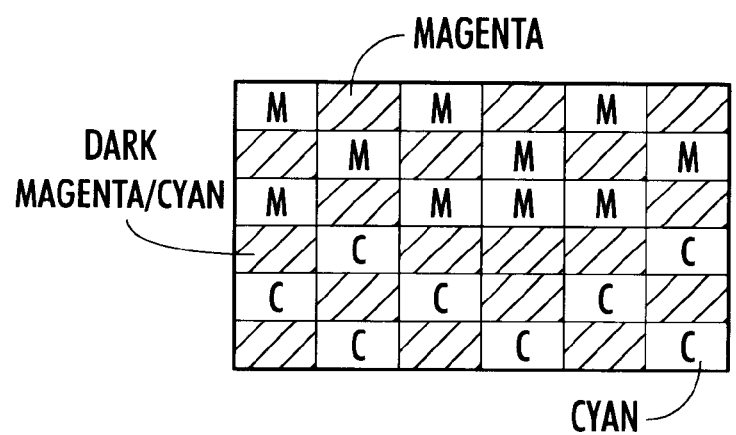
FIG. 11 illustrates an image formed when the two output patterns by halftone screens of FIGS. 9 and 10 are laid directly over each other.

FIG. 11 illustrates the strongly contrasted color image formed when the two halftone patterns on the right side of FIGS. 9 and 10, in their respective color separations, are directly laid over each other. The resulting image reveals the strongest color contrast between the cyan and magenta color separations between the portions forming the conjugately correlated portion and the auto-correlated portion. The enhanced color contrast can be used to represent visual patterns, shapes or outlines to form the color watermark.

Figure 12:
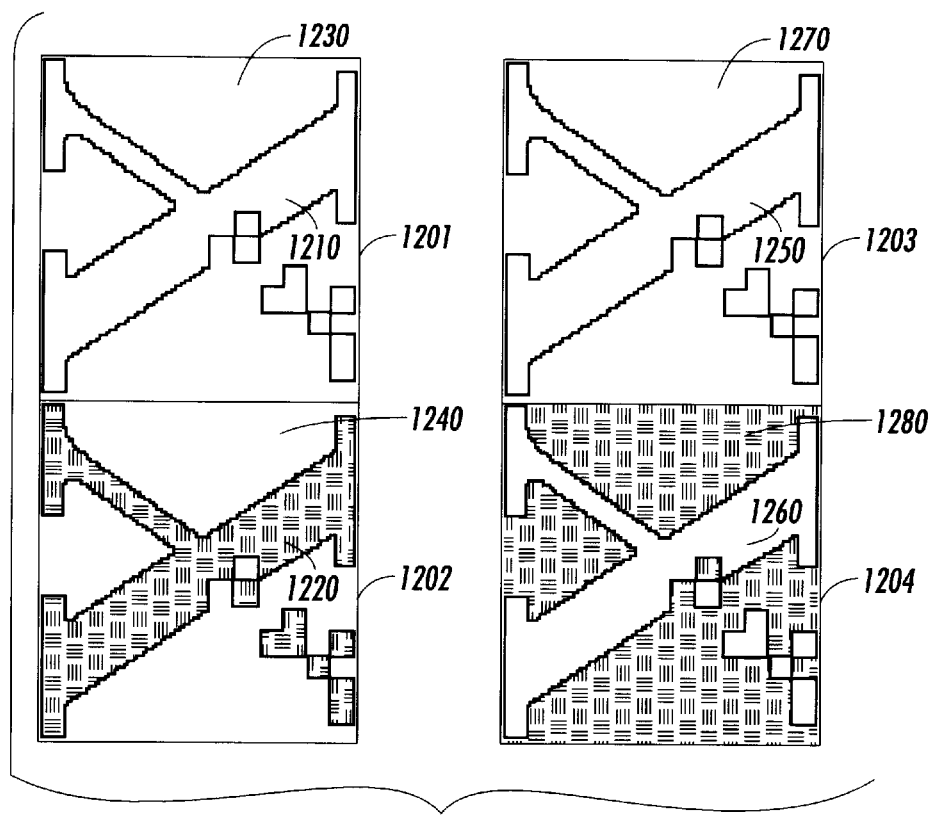
FIG. 12 illustrates a first stochastic halftone screen and a second stochastic conjugate halftone screen placed adjacent to each other according to an exemplary embodiment of this invention.

FIG. 12 illustrates two enlarged stochastic halftone screens containing two subcells in each halftone screen, each subcell containing a digitized X logo. In each of the halftone screens the bottom subcells 1202 and 1204 have regions that are conjugate to corresponding regions of the top subcells 1201 and 1202. Particularly, the conjugate regions are defined between the boundary formed by the inner and outer portions of the digitized X logo. The screen elements in the area 1230 in the top subcell 1201 of the first halftone screen, corresponding to the outer portions of the digitized X logo, are identical to the screen elements in the area 1240 in the bottom subcell 1202 of the first halftone screen, corresponding to the outer region of the digitized X logo. That is, areas 1230 and 1240 are identical. However, the screen elements in the area 1210 in the top subcell 1201 of the first halftone screen, corresponding to the inner region of the digitized X logo, are conjugate to the screen elements in the area 1220 in the bottom subcell 1202 of the first halftone screen, corresponding to the inner region of the digitized X logo.

It can be appreciated that at least one portion of the bottom subcell is conjugate to at least one portion of the top subcell. The top and bottom subcells 1201 and 1202 of the first halftone screen can be generated in a first color separation, such as, for example, magenta.

In the second stochastic halftone screen, the top subcell 1203 in the second halftone screen is identical to the top subcell 1201 in the first halftone screen. However, unlike the conjugate relationship defined for the first halftone screen for the inner regions 1250 and 1260 between the top and bottom subcells 1203 and 1204, respectively, the screen elements in the region 1250 in the top subcell 1203 in the second halftone screen, corresponding to the inner portion of the digitized X logo, are identical to the screen elements in the region 1260 of the bottom subcell 1204 in the second halftone screen, corresponding to the inner portion of the digitized X logo. Conversely, the screen elements in the region 1270 in the top subcell 1203 in the second halftone screen, corresponding to the outer portion of the digitized X logo, are conjugate to the screen elements in the region 1280 in the bottom subcell 1204 in the second halftone screen, corresponding to the outer portion of the digitized X logo.

It can be appreciated that at least one portion of the bottom subcell is conjugate to at least one portion of the top subcell. The top and bottom subcells 1203 and 1204 of the second halftone screen can be generated in a second color separation, such as, for example, cyan.

It can be understood from the above discussion that the first and second halftone screens contain at least two portions with the same size, the same shape and the same location. These common portions can be are designed as the desired watermark, for example, the X logo, as the subcells 1210 and 1220, 1250 and 1260.

Since the two screens are both based on the same stochastic screen optimization, the patterns generated by the two screens look approximately identical when viewed together in a single image. However, when the image is shifted relative to itself, such as, for example, by the mechanical action of printing an image containing the first and second screens of FIG. 12, for example, on a transparency and carefully shifting the image a distance of one subcell to another image printed on an image recording medium, the auto-correlation and conjugate correlation in the different color separations between the images becomes markedly apparent.

Figure 13:
FIG. 13 shows a color image containing an invisible watermark according to an exemplary embodiment of FIG. 12.
Figure 14:
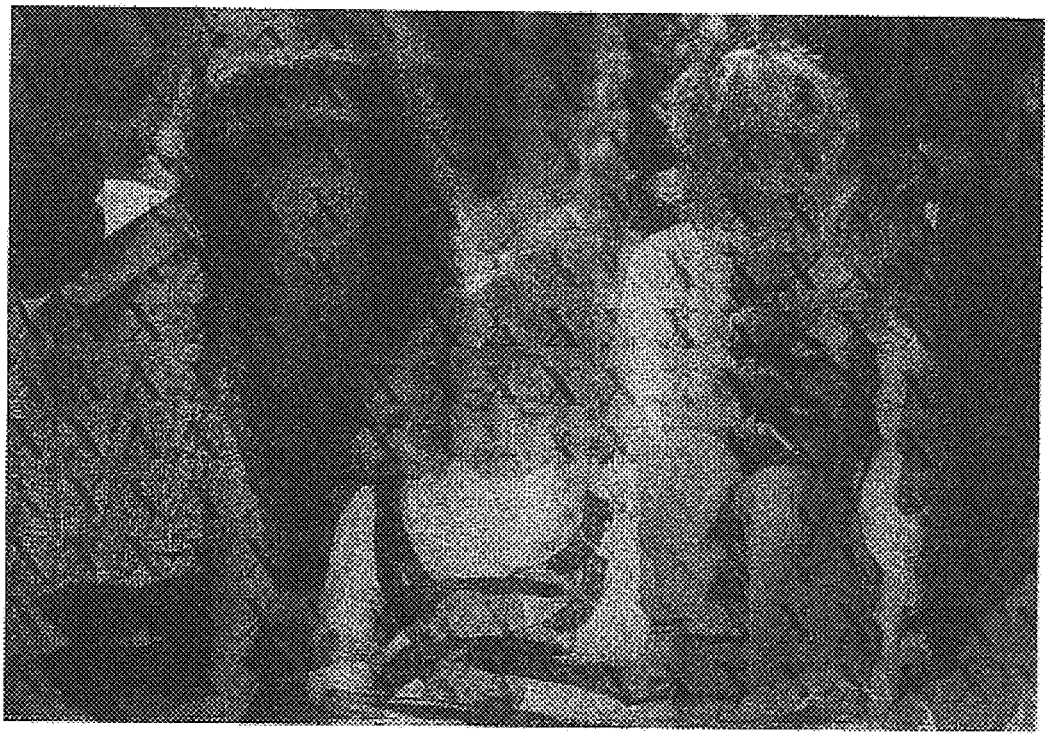
FIG. 14 shows the color image of FIG. 13 with the invisible watermark revealed, according to an exemplary embodiment of this invention.

FIG. 13 shows such a color image containing screens similar to those shown in FIG. 12, while FIG. 14 shows the resulting superimposed shifted color versions of the image of FIG. 13.

It can be appreciated that though FIG. 12 illustrates a conjugate relationship in a domain corresponding to the inner and outer portions of the digitized X logo, one of ordinary skill can readily apply this process to include conjugate relationships with more than two portions of a desired watermark. That is, a screen may apportion the subcell containing the watermark into three or more regions that are alternately conjugately correlated, as desired. Thus, each color separation screen can contain at least three subcells that provide alternating conjugate and auto-correlated relationships between portions of the watermark within each of the subcells, and between portions of the watermark within each of the other. Therefore, as each screen, generated in a different color separation, is appropriately overlaid and shifted accordingly, the contrasting separation colors can be readily visible between the alternately conjugated portions of the watermark.

Further, conjugate and auto-correlated portions of the stochastic halftone screens can be generated in non-adjacent regions of the halftone screens. One of general skill in the applicable arts can readily place the conjugate and identical portions in non-adjacent portions of the halftoned color image, and appropriately shift one or more of the stochastic halftone screens, to produce the same effect as superimposing the halftone screens directly above each other.

It will be further appreciated that although described with respect to the mechanical comparison technique described above, the increased signal resulting from the difference between the auto-correlated and conjugately correlated regions may be detected with image processing techniques. In particular, it may be possible to scan and digitize a digital-watermarked image and electronically superpose the conjugate image over the digitized image to detect the watermarked region on the digitized color image.

In an alternate method to generate an authenticable document, the information may also be incorporated by alternating between the two halftone cells while halftoning the original document. Therefore, the halftoned document is self-referencing and no special visualization "key" page is required for viewing the authentication image. Since portions generated by the two stochastic cells are side-by-side, self-referencing is immune from scaling and is robust to distortion introduced during printing and/or copying processes when the halftone document is generated or transferred.

Further, methods and systems for detecting embedded watermarks from halftone images are detailed in U.S. patent application Ser. No. 09/060,469 filed Apr. 15, 1998 and is, incorporated herein by reference in its entirety.

The use of stochastic halftone screens in more than one color separation permits multi-color watermarks with markedly strong color contrast along the relative boundaries of the conjugate and non-conjugate boundaries. Therefore, color watermarks generated using the systems and methods according to this invention are highly visible and readily distinguishable from the color image in the color document.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A process for generating an authenticatable color document, the color document comprising a plurality of color separations, wherein an authentication image is inserted into the color document and is not readily visually perceptible in the color document, the process including:

halftoning image data corresponding to at least a first color separation using a first stochastic halftone screen, wherein:

the first stochastic halftone screen has a plurality of cells, each cell having at least one first region and at least one second region, wherein each cell is spatially offset from a neighboring cell by at least a first distance, wherein, the at least one first region of at least a first cell of the first stochastic halftone screen is substantially identical to the at least one first region of at least a second cell of the first stochastic halftone screen, and the at least one second region of at least the first cell of the first stochastic halftone screen is substantially conjugate to the at least one second region of at least a second cell of the first stochastic halftone screen;

halftoning image data corresponding to at least a second color separation using a second stochastic halftone screen, wherein:

the second halftone screen has a plurality of cells, each cell having at least one first region and at least one second region, wherein each cell is spatially offset from a neighboring cell by at least the first distance, wherein, the at least one first region of at least a first cell of the second stochastic halftone screen is substantially conjugate to the at least one first region of at least a second cell of the second stochastic halftone screen, and the at least one second region of at least the first cell of the second stochastic halftone screen is substantially identical to the at least one second region of at least the second cell of the second halftone screen; and combining the halftoned image data of at least the first and second color separation images to form a multicolor image;

wherein, when at least a first copy of the multicolor image is spatially offset from at least a second copy of the multicolor image by at least the first distance, at least a first cell of each of the at least first and second copy of the multicolor images align with at least a second cell of the at least first and second copy of the multicolor images, and the contrast of the identical and conjugate regions become visible to form the authentication image.

2. The process of claim 1, wherein the at least first and second copies of the multicolor images are digital images and wherein placing the at least first and second copies of the multicolor images in a superimposed relationship comprises digitally processing the at least first and second copies of the multicolor images.

3. The process of claim 2, wherein digitally processing the at least first and second copies of the multicolor images includes shifting at least a portion of the at least first copy of the multicolor image relative to the at least second copy of the multicolor image.

4. The process of claim 3 wherein digitally processing the at least first and second copies of the multicolor images further includes logically combining at least the shifted portion of the copies of the multicolor images to detect the degree of correlation in the shifted portion.

5. The process of claim 1, wherein:

both the at least first and second copies of the multicolor images are rendered on substrates and at least one of the at least first and second copies of the multicolor images is rendered on a substantially transparent substrate; and placing the at least first and second copies of the multicolor images in a superimposed relationship comprises placing the transparent substrate over the other substrate in an aligned relationship.

6. The process of claim 1, wherein generating an authenticatable further comprises:

applying a respective screen to an input image to produce a halftoned output image;

rendering the halftoned output image in a human viewable form; and scanning the rendered image to produce a respective user image as a digitized representation of the rendered image.

7. The process as described in claim 1, wherein the first and second copies of the multicolor images are digital images and wherein the step of placing the first and second copies of the multicolor images in a superimposed relationship is accomplished by a logical combination of the first and second copies of the multicolor images.

8. A method for authenticating a color document, the color document comprising a plurality of color separations, including a color digital watermark, including:

concurrently designing a first stochastic screen in at least one or more of the color separations and a second stochastic screen in at least a one or more of the color separations simultaneously in accordance with an optimization metric, said designing step further including the constraint that a corresponding authentication region of both screens be comprised of values which are substantially conjugate of one another;

rendering an image using at least one of the first stochastic screens and at least one of the second stochastic screens to produce a first image, wherein the image is rendered by alternating between the at least two stochastic screens so as to produce a self-referencing watermark;

reproducing at least a portion of the image to produce a second image;

logically combining at least a shifted portion of the first and second images to detect a degree of correlation in the shifted portion; and detecting the authentication region by superposing a representation of the first image and a representation of the second image in an offset relationship so as to optimize the contrast of the colors of the authentication region resulting from the conjugate relationship between the first stochastic screen and the second stochastic screen.

9. The method of claim 8, wherein the step of detecting the authentication region further comprises scanning the rendered image to produce a digitized representation of the first image and storing the digitized representation of the first image; and where the step of reproducing at least a portion of the image to produce a second image comprises copying a portion of the stored digitized representation of the first image and storing the copied portion as the representation of the second image.

* * * * *